United States Patent
Aranya et al.

(10) Patent No.: US 10,951,677 B1
(45) Date of Patent: Mar. 16, 2021

(54) MANAGING A DISTRIBUTED SYSTEM PROCESSING A PUBLISHER'S STREAMING DATA

(71) Applicant: Quantcast Corporation, San Francisco, CA (US)

(72) Inventors: Akshat Aranya, San Francisco, CA (US); Mark Cooper, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 10 days.

(21) Appl. No.: 16/416,828

(22) Filed: May 20, 2019

Related U.S. Application Data

(63) Continuation of application No. 15/862,889, filed on Jan. 5, 2018, now Pat. No. 10,298,648, which is a continuation of application No. 14/871,194, filed on Sep. 30, 2015, now Pat. No. 9,900,360.

(51) Int. Cl.
*G06F 15/16* (2006.01)
*H04L 29/06* (2006.01)
*G06Q 30/02* (2012.01)
*G06F 16/28* (2019.01)
*G06F 16/2455* (2019.01)

(52) U.S. Cl.
CPC ...... *H04L 65/601* (2013.01); *G06F 16/24568* (2019.01); *G06F 16/285* (2019.01); *G06Q 30/02* (2013.01); *H04L 65/607* (2013.01)

(58) Field of Classification Search
CPC ............ H04L 65/601; H04L 65/607; G06F 16/24568; G06F 16/285; G06Q 30/02
USPC .................................................. 709/217, 223
See application file for complete search history.

(56) References Cited

U.S. PATENT DOCUMENTS

| | | | |
|---|---|---|---|
| 7,243,075 B1 | 7/2007 | Shaffer et al. | |
| 9,613,127 B1 | 4/2017 | Rus et al. | |
| 9,865,004 B1 | 1/2018 | Snoddy et al. | |
| 2011/0040725 A1* | 2/2011 | Sugimoto | G06F 16/211 707/609 |
| 2011/0106584 A1* | 5/2011 | Borthwick | G06Q 30/02 705/7.31 |
| 2012/0239489 A1* | 9/2012 | Peretti | G06Q 30/02 705/14.45 |

(Continued)

*Primary Examiner* — David R Lazaro
*Assistant Examiner* — Mariegeorges A Henry
(74) *Attorney, Agent, or Firm* — Robin W. Reasoner; Andrea Wheeler

(57) ABSTRACT

A distributed system processing a publisher's streaming data. The distributed system comprises multiple workers and publisher data stores, each publisher data store dedicated to a worker and a publisher. A sampling ratio (the fraction of data items for storage in the publisher's data store) is selected by a publisher data store's worker based on historical information. At least two workers select different sampling ratios. Data items representing an interaction between an entity and the publisher are received. Each data item is assigned to a worker for processing. A hash function is applied to the data item's identifier, resulting in a key value falling within the hash function's range. The scope of the publisher's data store is equal to the hash function's range multiplied by the sampling ratio of the publisher's data store. A data item with a key value within the scope of the publisher's data store is stored therein.

20 Claims, 4 Drawing Sheets

(56) References Cited

U.S. PATENT DOCUMENTS

2014/0033223 A1* 1/2014 Swart .................... G06F 9/5066
718/105
2016/0179852 A1* 6/2016 Naibo .................... G06F 16/26
707/805

* cited by examiner

MANAGING A DISTRIBUTED SYSTEM PROCESSING A PUBLISHER'S STREAMING DATA

CROSS-REFERENCE TO RELATED APPLICATIONS

This application is a continuation of U.S. Non-Provisional application Ser. No. 15/862,889 entitled "Managing a Distributed System Processing a Publisher's Streaming Data" by Akshat Aranya and Mark Cooper, filed on Jan. 5, 2018, which is a continuation of U.S. Non-Provisional application Ser. No. 14/871,194 entitled "Managing a Distributed System Processing a Publisher's Streaming Data" by Akshat Aranya and Mark Cooper, filed on Sep. 30, 2015, now U.S. Pat. No. 9,900,360 issued on Feb. 20, 2018, all of which are hereby incorporated by reference in their entirety.

BACKGROUND

Technical Field

This invention pertains in general to distributed storage and in particular to methods of managing a distributed system processing streaming data.

Description of Related Art

Distributed processing systems are used in the collection and analysis of global internet activity. Depending on the configuration, a distributed processing system can be more reliable than a monolithic system and operate using less expensive hardware. Once data is collected, processed and subsequently stored in a distributed or central data storage, the work of data mining can begin. In an example, the information related to the audience of a networked publisher (e.g. visitors to a website) can be collected for a time period and stored. Insights related to the audience can be gleaned by querying the stored information after the time window has closed. However, depending on the architecture of the distributed system and the volume of data involved the results of a query may not be available until hours after the required data is collected.

A distributed processing system can be configured to efficiently collect and process a predictable volume of data. However, real Internet traffic patterns can be very unpredictable with traffic spikes and viral content. Deploying and maintaining a distributed system with reserved storage configured for peak data volumes can be prohibitively expensive.

What is needed is a distributed system which can flexibly adapt to changing data volumes and rapidly provide a networked publisher with a fresh view of their audience, based on very recently acquired data.

SUMMARY

Embodiments of the invention include a method, a non-transitory computer-readable storage medium and a system for managing a distributed system processing a networked publisher's streaming data. In an embodiment, the distributed system comprises a plurality of workers which process a publisher's streaming data. The publisher's streaming data is comprised of data items, with each data item representing an event (e.g. a website visit) associated with an entity (e.g. a browser) from a plurality of entities (e.g. the networked publisher's audience). Each data item may include an identifier, such as a cookie value or hashed cookie value. Each worker stores data in a respective data partition comprising at least one publisher data store. Each publisher data store is dedicated to a worker and a networked publisher. A publisher data store's sampling ratio defines a fraction of a publisher's data items assigned to the worker for storage in the publisher data store. Each worker selects a sampling ratio for each of their respective publisher data stores based on historical information such as a publisher data store's historical sampling ratio, historical volume of data items received by the worker or historical volume of data items stored in a publisher data store. At least two workers select different sampling ratios for publisher data stores storing data items of the same publisher. The streaming data is received at the distributed system and each data item of the streaming data is assigned to a respective worker. Each data item is processed by a respective assigned worker. An assigned worker processes a data item by applying a hash function to the data item's identifier, resulting in a key value which falls within the hash function's range. The key value is compared to the scope of the assigned worker's publisher data store, which is equal to the hash function's range times the publisher data store's selected sampling ratio. Responsive to the key value falling within the publisher data store's scope, the data item is stored in the publisher data store. Advantageously, a representative portion of the streaming data can be maintained in the distributed system's publisher data stores. Because the sampling ratios of the publisher data stores can diverge across the distributed system, the system can efficiently respond to local traffic spikes and lulls, which is especially important for a networked publisher with a global audience or trendy content and a new networked publisher with no history to guide storage provisioning. Furthermore, queries executed on the data items stored in the publisher data stores can provide a rapid estimate of the results expected from a query executed on all of the streaming data.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide a solution to the problem of managing a distributed system processing a networked publisher's streaming data. Advantageously, by enabling each worker in the distributed system to select a sampling ratio based on historical information such as a historical sampling ratio or historical received data item volume, each worker can independently respond to spiky traffic patterns by keeping more (or less) of the publisher's streaming data. Unlike a distributed system with a system-wide fixed sampling ratio, an embodiment of the invention enables the storage of a small fraction of the publisher's streaming data by a worker receiving abundant streaming data, thereby conserving storage expense, while enabling a different worker exposed to sparse streaming data to store a larger fraction of the publisher's streaming data, thereby preserving a meaningful, representative sample. This solution provides an economical solution by limiting the storage required to store a representative sample of the publisher's streaming data while still preserving the ability to draw meaningful insights from the stored information. Furthermore, queries run on the stored sampled data can execute rapidly and provide fresh insights even as the publisher's data streams in to the distributed system. Embodiments of the invention are described below in the context of processing a networked publisher's streaming data. Embodiments of the invention can be implemented to process the streaming data of multiple different networked publishers. It is noted that similar techniques as those described below can be used in processing other types of data as well. Such techniques are particularly useful where streaming data rates are highly variable with respect to time, location or both. Similarly, such techniques are well adapted for use with unpredictable streaming data rates which may be seen with a new publisher or new streaming data source which has little or no history.

Figure 1:
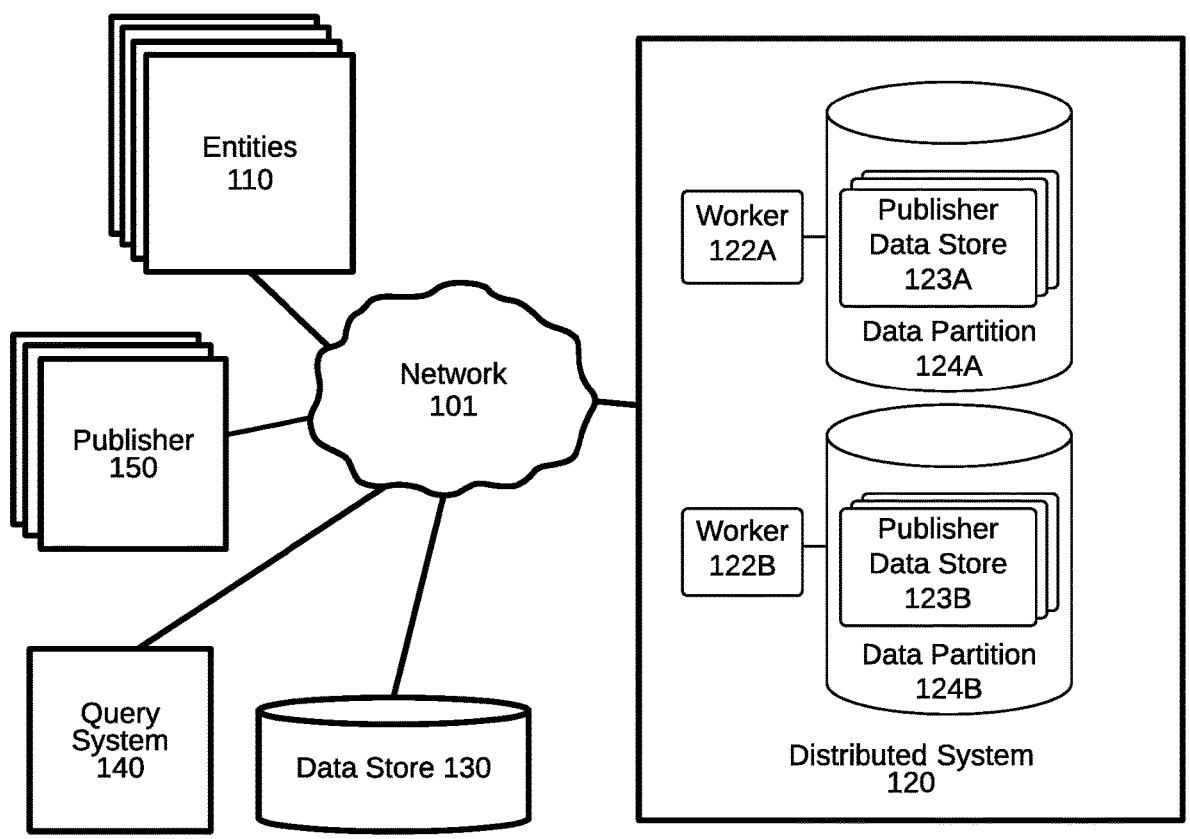
FIG. 1 is a high-level block diagram of a computing environment for managing a distributed system processing a networked publisher's streaming data, in accordance with an embodiment of the invention.

FIG. 1 is a high-level block diagram of a computing environment for managing a distributed system 120 processing a networked publisher's streaming data, in accordance with an embodiment of the invention. The computing environment includes entities 110, a distributed system 120, a data store 130, a query system 140 and a publisher 150.

A networked publisher 150 provides content (e.g. a webpage, advertising content, airline status, driving instructions) to entities 110 over the network 101. A website, a mobile application and a GPS (Global Positioning System) navigation system are examples of a networked publisher 150.

In an embodiment, entities 110 can be web browsers executing on user devices, such as personal computers, laptop computers, tablet computers, and smartphones, as the users of those devices browse the web. As users undertake their normal web browsing activities using the browsers (entities 110), in one embodiment, data for some events, such as media consumption events, is reported to the distributed system 120. A media consumption event is the act of accessing content over a network, such as, but not limited to, accessing a web page from a web server or receiving advertising content. A variety of methods exist for associating an anonymous identifier with a web browser. For example, a hardware device identifier such as a Media Access Control Address (MAC address) which can be stored on a device operated by a user to access content over a network. As another example, a software identifier such as a cookie value can be locally stored. In other embodiments, identifiers can be composed and/or stored remotely from a device associated with the user. In some cases, a browser can have multiple identifiers, such as multiple first party cookies and multiple third party cookies, which can be used to identify the browser to various systems. A direct measurement system can collect and/or receive information for a browser or a system in conjunction with the identifier. In some cases, information collected and/or received by the direct measurement system can be processed before it is stored. For example, when a browser requests content from a content provider, the content provider can re-direct the browser to submit a pixel request to the direct measurement system. Based on the pixel request, and optional subsequent actions and/or interactions, the direct measurement system can collect and/or receive information from the browser in conjunction with an identifier in order to enable the maintenance of a coherent body of information, such as a consumption history, a portion of a consumption history, a consumption history score, a consumption history characterization and/or a consumption history digest, over time.

In the example illustrated in FIG. 1, the distributed system 120 receives data items from the entities 110. The received data items enable the distributed system 120 to record media consumption events in conjunction with an anonymous identifier, such as a cookie value or hashed cookie value. The distributed system may record data items in a distributed data storage system comprising data partitions (e.g. data partition 124A and 124B), data store 130 or combinations thereof. In FIG. 1, data store 130 is shown as external to the distributed system 120, but in other implementations, data store 130 may be internal to the distributed system 120. Also, only one instance of data store 130 is shown in FIG. 1 for clarity, but in practice, the data store may comprise a plurality of data stores, such as a distributed network of storage facilities. The received data items may include information, such as information about a hardware or software configuration associated with the entity (e.g. the operating system that operates the browser, the screen resolution, the screen size, etc.), a status (e.g. the number of points earned in a mobile game) or combinations thereof.

An entity 110 can represent a networked consumer and can be a device (e.g. a mobile device, wearable device or a desktop computer) or an application (e.g. a cell phone game, cell phone application). For example, an application can be executed on a user device, such as a personal computer, laptop computer, tablet computer, smartphone, a specialized hardware gaming device, and augmented reality (AR) system, a set-top unit (STU) such as a STU used in conjunction with cable television service or a wearable device. In one embodiment, as users undertake their normal activities using entities such as operating applications, devices or both, data for some events, such as media consumption events, interactions with an application, status events and ad exposures, can be reported to the distributed system 120. The data enables the distributed system 120 to record data items in conjunction with an anonymous identifier, such as a device identifier, application identifier or both. The received data item may enable the distributed system 120 to record information about the entity, such as the operating system operating on the device, characteristics of the entity (e.g., screen resolution, application version, patch level) and a device or application status (e.g. points accumulated playing a cell phone game, battery charging status).

An entity 110 which receives content, such as a web page, from a networked publisher 150, such as a website, can also be called a visitor to that networked publisher (i.e. a website visitor). Collectively, the visitors to a networked publisher may be called the audience of the networked publisher. In an example, an entity can receive content, such as software downloaded over the network, from a networked publisher, such as a mobile applications or mobile services provider. An entity 110 can receive content, such as advertising content, from a networked publisher 150 or a proxy of the networked publisher.

A variety of methods exist for associating an anonymous identifier with an entity. For example, a hardware device identifier such as a Media Access Control Address (MAC address), an International Mobile Station Equipment Identity (IMEI), a Mobile Equipment Identifier (MEID), or an Electronic Serial Number (ESN) can be stored on a device operated by a user to access content over a network. As another example, a software identifier such as a cookie value, an application identifier, an application installation identifier, or an operating system identifier such as an Android_ID or Unique Device ID (UDID) can be locally stored on a device. In other embodiments, identifiers can be composed and/or stored remotely from a device associated with the entity. In some cases, a browser can have multiple identifiers, such as multiple first party cookies and multiple third party cookies, which can be used to identify the browser to various systems.

Query system 140 may be used to glean insights from data collected by the distributed system 120. In some embodiments, query system 140 may be part of distributed system 120. In an example, query system operates to provide an estimated count of data items matching a set of one or more constraints. Query system 140 may provide the results of a query (e.g. an estimated count of data items received by the distributed system 120 and meeting query constraints) in response to a query received by the query system 140, as the result of a scheduled job, or in response to a triggering condition. A publisher's visitor count for a time window exceeding an upper limit or falling below a lower limit is an example of a triggering condition. A constraint may limit an estimated count of data items received at the distributed system to data items with a timestamp falling in a specified time window, data items associated with specific location (e.g. an estimated count of data items associated with a specified country, time zone, g-eographic region), data items associated with a specified networked publisher or combinations thereof. In an embodiment, a constraint may apply a limitation based on a known or derived feature of an entity (e.g. an estimated count of data items associated with an inferred demographic profile, an estimated count of data items with the search term "shoes" in a referral string).

Distributed system 120 comprises at least two workers (e.g. workers 122A and 122B)) and at least two data partitions (e.g. data partitions 123A and 123B). The workers and the data partitions of the distributed system 120 may all be implemented on the same hardware platform or be distributed across multiple hardware platforms which may in turn be distributed across multiple locations. Each data partition is dedicated to a worker (e.g. data partition 124A is dedicated to worker 122A, data partition 124B is dedicated to worker 122B). Each data partition comprises at least one publisher data store (e.g. data partition 124A comprises publisher data store 123A, data partition 124B comprises publisher data store 123B). Each publisher data store is dedicated to a networked publisher (publisher data store 123A and publisher data store 123B are dedicated to publisher 150). Although, only two workers and two data partitions are illustrated in FIG. 1, a distributed system 120 may comprise three or more workers and three or more data partitions which may or may not be distributed across multiple hardware platforms. Furthermore, the workers, the data partitions or both may be geographically distributed and more than one location of the distributed system 120 may receive data items. For example, for a distributed system 120 serving a globally popular publisher 150, workers, data partitions or both may be deployed at multiple locations, and a portion of the publisher's streaming data may be received and processed at each location. Furthermore, a data partition and its paired worker (e.g. data partition 124A dedicated to worker 122A) are not necessarily located on the same device (e.g. server or server rack) or in the same location (e.g. data center).

A worker selectively stores data items in its dedicated data partition. In an embodiment illustrated in FIG. 1, data partition 124A is dedicated to worker 122A and data partition 124B is dedicated to worker 122B. A data partition can have a finite size which may be called a data budget. However, in some embodiments, the size of the data partition may be allowed to grow. Each data partition comprises at least one publisher data store. Each publisher data store is dedicated to one networked publisher. In FIG. 1, publisher data stores 123A and 123B are dedicated to publisher 150. The sampling ratio is the fraction of data items received by the worker which are selected for storage by the worker in a publisher data store of the worker's dedicated data partition. A publisher data store's sampling ratio is selected by the data partition's worker. In an example, a worker may select a sampling ratio based on one or more historical sampling ratios. For example, a publisher data store's new sampling ratio may be selected by a worker based on the most recently selected sampling ratio for that publisher data store. In another example, a publisher data store's new sampling ratio may be selected based on a combination of sampling ratios previously selected for the publisher data store (e.g. an average of the last two or more sampling ratios).

In an embodiment, a worker may select a sampling ratio based on historical information instead of or in addition to selecting a sampling ratio based on a historical sampling ratio. The number of a publisher's data items assigned to the worker in a previous time window (e.g. the number of a publisher's data items assigned to the worker in an hour) and the average, peak or minimum rate of a publisher's data items assigned to the worker during a previous time window (e.g. number of a publisher's data items per unit time) are examples of historical information that may be used individually or in combination to select a sampling ratio. A worker that has historically been assigned a small number of a publisher's data items (or a low rate of a publisher's assigned data items), might select a high sampling ratio with the expectation of being able to store a large fraction of the publisher's data items in a publisher data store of its dedicated data partition whereas a worker which has been assigned a large number of the publisher's data items (or a high rate of the publisher's assigned data items) might select a low sampling ratio with the expectation that a publisher data store of its dedicated data partition could only store a small fraction of the publisher's assigned data items.

In an embodiment, a worker may select or adjust a sampling ratio based in part on predicted data volumes, data rates or trends. For example, expected daily or seasonal fluctuations in a publisher's traffic may be used to predict an increase or decrease in the number of data items which will be assigned to each worker, and the worker may select or adjust a sampling ratio accordingly.

Distributed system 120 receives a networked publisher's streaming data such as data items from the audience of publisher 150. In an example, a data item represents information related to an entity and a networked publisher such as an interaction between the entity and the networked publisher. For example, each data item may represent a website visit to the publisher's website by an entity. A data item may represent a status with respect to an entity and a networked publisher (e.g. a high score achieved by the entity in a mobile game). An identifier may be associated with each data item. For example, the data item may include one or more identifiers such as a hardware identifier (e.g. a MAC address), a software identifier (e.g. a cookie) or both. In some cases, an identifier can be composed and associated with the data item at the distributed system.

Each data item is assigned to a worker. A variety of different techniques may be used to distribute the data item assignments. In an example, data items may be assigned to a worker based on the workload of the worker, the location of the worker or both (e.g. a received data item may be assigned to the idle worker closest to the location where the data item was received). In an example, data items may be distributed to workers according to a round-robin mechanism. For example, an ordered list of workers may be maintained and the distributed system may assign a data item from the stream of data items to the workers based on their order (e.g. the first worker is assigned the first data item, the second worker is assigned the second data item, etc.). Once the distributed system reaches the end of the ordered list of workers, it may loop back to the start of the ordered list of workers and continue assigning data items sequentially. In this case, multiple data items from the same entity are not necessarily assigned to the same worker.

In an example, some care may be taken to assign data items from the same entity to the same worker. For example, the distributed system 120 may associate a range of identifier values with each worker and route data items to the workers accordingly. In a similar example, a distribution function, such as a hash function may be used to select a worker for a data item. The distributed system may associate a range of hashed identifier values with each worker. In this case, the distributed system 120 can apply a distribution function to a data item's identifier and assign the data item to a worker based on the result and the range of the worker.

A data item is processed by its assigned worker. Processing a data item includes deciding if the data item should be stored in the assigned worker's data partition or not. Processing a data item comprises computing a key value by applying a hash function to the data item's identifier. A hash function produces a key value that falls within a range of values bounded by a maximum key value and a minimum key value. The size of the range is the minimum key value subtracted from the maximum key value. A hash function may be selected based on its ability to map the expected inputs (the data item's identifier) evenly across the hash function's range of key values. Each publisher data store has a scope. The publisher data store's scope is equal to the size of the hash function's range multiplied by the sampling ratio selected for the publisher data store by the data partition's worker. After the key value is computed, it is compared to the publisher data store's scope. If the computed key value falls within the publisher data store's scope, the data item is stored in the publisher data store of the assigned worker's data partition. Advantageously, this enables each worker to store a representative sample of its assigned data items to the worker's data partition. In an embodiment, a worker may store a data item in a publisher data store of a data partition in conjunction with information such as a time stamp, a sampling ratio, an identifier unique to the publisher or combinations thereof. In an embodiment, the same hash is not used in both the selection of a worker for a data item and in the processing of the same data item by its assigned worker. However, in another embodiment, a few digits of a key value generated with a hash function may be used as a distribution function to select a worker for a data item and a different combination of digits of the same key value (generated with the same hash function) may be used by the selected worker in processing the assigned data item.

In some cases, information may be extracted from a data item, and used to infer information (e.g. an estimated age of a website visitor based on a combination of the device type, time of day, and content item accessed) or cross-reference the data item with other information (e.g. a data item may represent an exposure to advertising content, a campaign tag may specify the exposure's advertising campaign, the data item can be cross-referenced with advertising campaign data in this way). In some cases, inferred information, cross-referenced information or combinations thereof may be stored in conjunction with a data item in a publisher data store.

In an embodiment, a distributed system's workers may each select an updated sampling ratio. For example, a worker may update a sampling ratio according to a schedule (e.g. hourly, daily at 3 PM local time). In an embodiment, a worker may select an updated sampling ratio based on historical information such as the volume of a publisher's data items stored during a time window. For example, in response to determining that a number of data items stored in a publisher data store during a time window exceeds an upper limit, a worker may decrease the sampling ratio of that publisher data store. Similarly, in response to determining that a number of a publisher's data items stored in a publisher data store during a time window falls below a lower limit, a worker may increase the sampling ratio of that publisher data store. As a result, the amount of time spent using a particular sampling ratio may vary for a publisher data store over time. Furthermore, the amount of time spent using a particular sampling ratio may vary from worker to worker. In an embodiment, sampling ratio updates may be synchronized across some or all of the distributed system 120 (e.g. some or all of the workers of a distributed system may update the sampling ratio of their respective publisher data store(s) at the same time). However, in an embodiment, each worker of the distributed system 120 may update the sampling ratio of one or more of its publisher data stores without synchronizing with another worker.

A query of the data items stored in the data partitions may be executed. Because the data items stored in the data partitions represent only a fraction of the data items of the streaming data received at the distributed system, the results of such a query provide an estimate. However, by leveraging the power of distributed processing and operating on a representative subset of the received streaming data, the results of such a query can be produced rapidly and efficiently by distributed system 120, even as the data continues to stream in to the distributed system 120.

In an embodiment, query system 140 sends requests including the query constraints to workers 122A and 122B. Each worker analyzes the data items stored in their respective data partitions 123A and 123B to estimate a count of data items received by the distributed system 120 which are represented in their respective data partitions. In some cases, a query may be limited by one or more constraints. In an example, the query may be constrained by publisher (e.g. limited to data items of a specified publisher), time (e.g. limited to data items received during a specified time window), location (e.g. limited to data items originating from entities in the country of Canada), information included in the data item (e.g. limited to data items which include the feature "mobile phone", limited to data items which include a referral string with the search term "shoes"), information inferred or cross-referenced from the data item, or combinations thereof.

The query system 140 composes a request including the query constraints and distributes the request to each of the workers 122A and 122B of the distributed system for execution by each respective worker. Each data item stored in a publisher data store represents one or more data items received by the distributed system. In an example, a tally is determined by each worker; the tally is a count of data items stored in the respective worker's publisher data store meeting the constraints of the query. In an example, the tally can be divided by the sampling ratio of the respective worker's publisher data store to estimate how many data items received by the distributed system the tally represents, if all data items in the partition were stored based on the same sampling ratio. Each worker can send its respective estimate to the query system 140. The result of the query can be determined at the query system 140 by aggregating the received estimates.

In another embodiment, a worker may produce an estimate by counting each data item in a publisher data store which meets the conditions of the query as the inverse of the sampling ratio in place at the time the data item was stored. For example, if the sampling ratio was 25% (equivalent to the fraction ¼) at the time a data item was stored, it is estimated that the data item would represent four (the inverse of the fraction ¼) data items received by the distributed system, and would contribute to the worker's count accordingly. The actual number of items represented may vary slightly based on the characteristics of the hash function used to compute the key value. A worker would produce an estimate by summing up the contributions from all of the data items in the worker's publisher data store which meet the conditions of the query and send the estimate to the query system 140. In some cases, a sampling ratio may have been stored in the publisher data store in conjunction with each respective data item. In an example, a publisher data store's history of sampling ratios may be maintained and made available to the publisher data store, the publisher data store's data partition, the query system or combinations thereof. In an example, the correct sampling ratio to use for query operations may be selected based on a timestamp of the stored data item in combination with the publisher data store's history of sampling ratios. In another example, data items are stored in a publisher data store in time sequence and each time a sampling ratio is selected for the publisher data store, the value of the newly selected sampling ratio is inserted into the time sequence. This enables the distributed system to determine the sampling ratio that was in use at the time a stored data item was stored. Advantageously, this enables the distributed system to estimate the number of a publisher's data items received by the distributed system which are represented by each data item stored in a publisher data store.

In an embodiment, a query of the number of unique data items represented by the data items stored in publisher data stores may be determined. For example, a query may request the number of unique visitors to a website. In this case, a tally of the unique visitors to a networked publisher may be determined by each worker; in this case, a worker counts the number of data items stored in the publisher's data store, counting all the data items having the same identifier (or hashed identifier) as only one count. In an example, if all data items in the publisher's data store were stored based on the same sampling ratio, the count can be divided by the sampling ratio of the respective worker's publisher data store to estimate how many data items received by the distributed system are represented by the count. Each worker can send its respective estimate to the query system 140. The result of the query can be determined at the query system 140 by aggregating the received estimates. The result of the query is an estimate of the unique number of data items received by the distributed system 120. The accuracy is increased if all of the data items associated with a particular identifier are routed to the same worker. When data items associated with the same identifier are routed to different workers, uniques can be miscounted.

Although the operation of the distributed system 120 has been described with respect to only one publisher 150, an embodiment of the distributed system 120 may receive and store data items of multiple publishers. In an embodiment, each worker's data partition may comprise multiple publisher data stores. For example, worker 122A's data partition 124A may comprise two or more publisher data stores 123A, with each publisher data store storing data items of one of a plurality of networked publishers. In this case a single worker (e.g. 122A) may select and/or update sampling ratios for publisher data stores of different networked publishers independently of each other.

Figure 2:
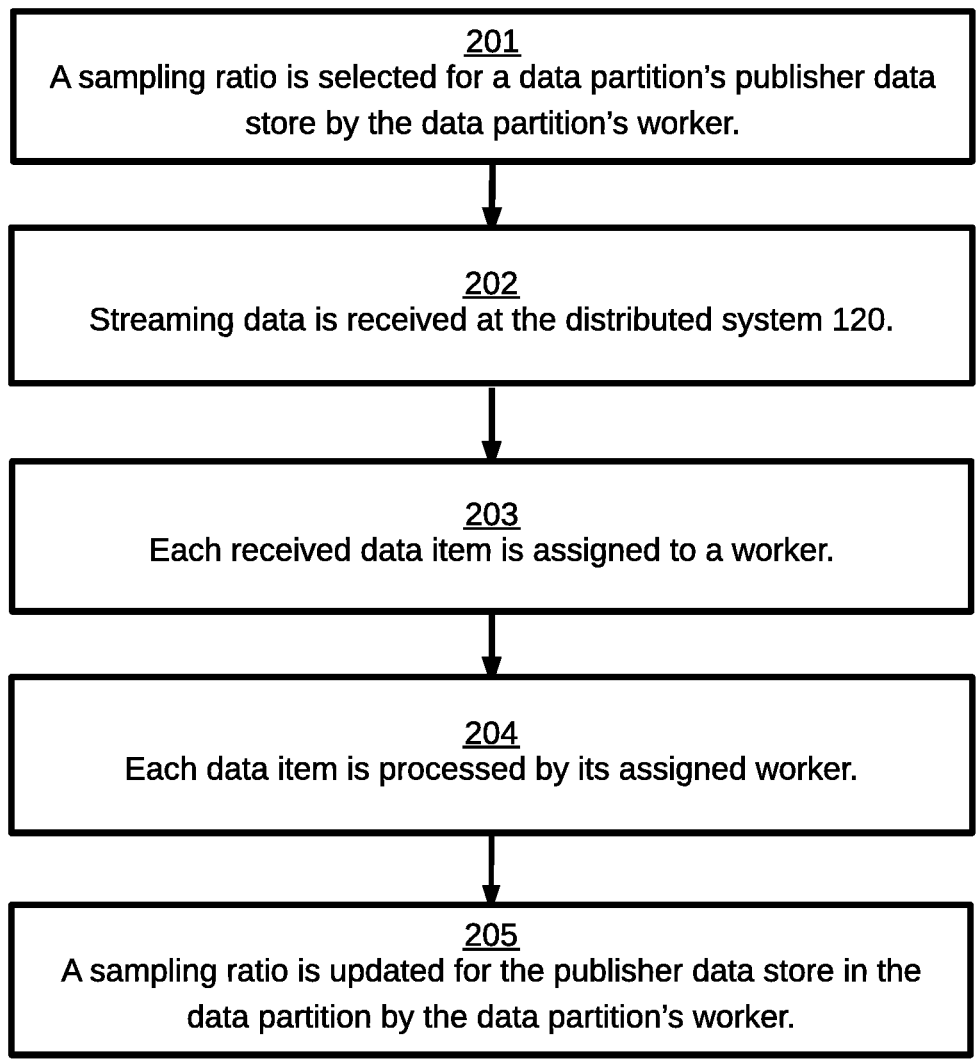
FIG. 2 is a flow chart illustrating a method of managing a distributed system processing a networked publisher's streaming data, in accordance with an embodiment of the invention.

FIG. 2 is a flow chart illustrating a method of managing a distributed system processing a networked publisher's streaming data, in accordance with an embodiment of the invention. In some implementations, the steps are performed in an order other than the order presented in FIG. 2, and in other implementations, additional or alternative steps may be performed.

In step 201, a sampling ratio is selected for a data partition's publisher data store by the data partition's worker. A publisher data store's sampling ratio defines a fraction of a publisher's data items for storage in that publisher data store. A sampling ratio may be selected based on historical information such as a publisher data store's historical sampling ratio, a historical number of a publisher's data items received by a worker in a time window or combinations thereof. For example, worker 122A can select a sampling ratio for publisher data store 123A based on an average of the publisher data store's 123A three most recent sampling ratios. There is no constraint requiring workers to select the same sampling ratio for different publisher data stores. In the example illustrated in FIG. 1, publisher data store 123A and publisher data store 123B may store data items of the same publisher 150 and may have different sampling ratios.

In step 202, streaming data is received at the distributed system 120. The streaming data comprises data items. In an example, each data item represents information related to an entity and a networked publisher such as an interaction between an entity 110 from the audience of the networked publisher 150 and the networked publisher 150. Each data item comprises an identifier, such as an identifier of the respective entity (e.g. a cookie value). In another embodiment, an identifier may be generated and associated with the data at the distributed system 120.

In step 203, each received data item is assigned to a worker. In some cases, some care may be taken to assign all data items associated with an entity to the same worker. Assigning all data items associated with a particular entity to the same worker can improve the accuracy of some queries, such as a query counting the number of unique visitors to a website.

In step 204, each data item is processed by its assigned worker. Processing a data item comprises determining if the data item should be stored in the assigned worker's data partition in a publisher data store of the data item's networked publisher. A key value is computed by applying a hash function to the data item's identifier. The hash function produces a key value falling within a range. Each publisher data store in a data partition has a scope that is equal to the hash function's range multiplied by the sampling ratio of the respective publisher data store (selected in step 201). The key value is compared to the scope of the publisher data store of the data item's networked publisher in the assigned worker's data partition. Responsive to the key value falling within the publisher data store's scope, the data item is stored in the publisher data store of the data item's networked publisher in the assigned worker's data partition. In some cases, information may be stored in conjunction with the data item such as a timestamp, the sampling ratio or combinations thereof.

Using a hash function as a distribution function to select a worker for a data item and then later applying a hash function to the data item's identifier to determine if the selected worker will store the data item is operationally costly. In some cases, the result of applying a hash function to a data item's identifier may be used for both purposes (e.g. selecting a worker and determining if the data item will be stored by the selected worker). In an example, applying a hash function to an identifier may result in a thirty-two digit value. The distributed system 120 may use the first six digits of this thirty-two digit value to distribute data items to workers (e.g. each worker will be assigned data items with a six digit value falling within a specified range). In this example, the key value, used to determine if a data item will be stored by its assigned worker, will comprise the last twenty four digits of the thirty-two digit value. In this example, for the purposes of the operation of the distributed system, the hash function's effective range is the range of possible key values produced with the limited number of digits (in this case, the last twenty-six digits). In order for the worker to use the partial result of applying the hash function to the data item's identifier, the partial or complete result must be available to the worker (e.g. stored in a storage location accessibly by the worker, sent to the worker).

In Step 205, a sampling ratio is updated for the publisher data store in the data partition by the data partition's worker. In an embodiment, an updated sampling ratio may be selected for some or all of the publisher data stores in the distributed system, with each updated sampling ratio selected by the respective publisher data store's worker. In an embodiment, a worker may select an updated sampling ratio based on historical information such as the volume of a publisher's data items stored during a time window. In an example, the distributed system 120 may monitor the number of data items stored in a publisher data store during a time window; in response to determining or detecting that the number of data items stored in a publisher data store during a time window exceeds an upper limit, a worker may decrease the sampling ratio of that publisher data store. Similarly, in response to determining or detecting that a number of a publisher's data items stored in a publisher data store during a time window falls below a lower limit, a worker may increase the sampling ratio of that publisher data store. As a result, the amount of time spent using a particular sampling ratio may vary for a publisher data store over time.

In an embodiment, a data partition's worker may select an updated sampling ratio for a publisher data store according to a schedule. A worker may select an updated sampling ratio for a publisher data store synchronized with one or more other workers or asynchronously. In an embodiment, selecting an updated sampling may be triggered by external input. In an embodiment, the distributed system 120 may monitor resources and trigger the update of one or more publisher's data stores responsive to detecting an update criteria (e.g. a publisher's data store stored more than a maximum number of data items in a time period). In an example, a worker may update the sampling ratios of some or all of its publisher data stores. A worker may update the sampling ratios of publisher data stores of different networked publishers independent of each other.

Figure 3:
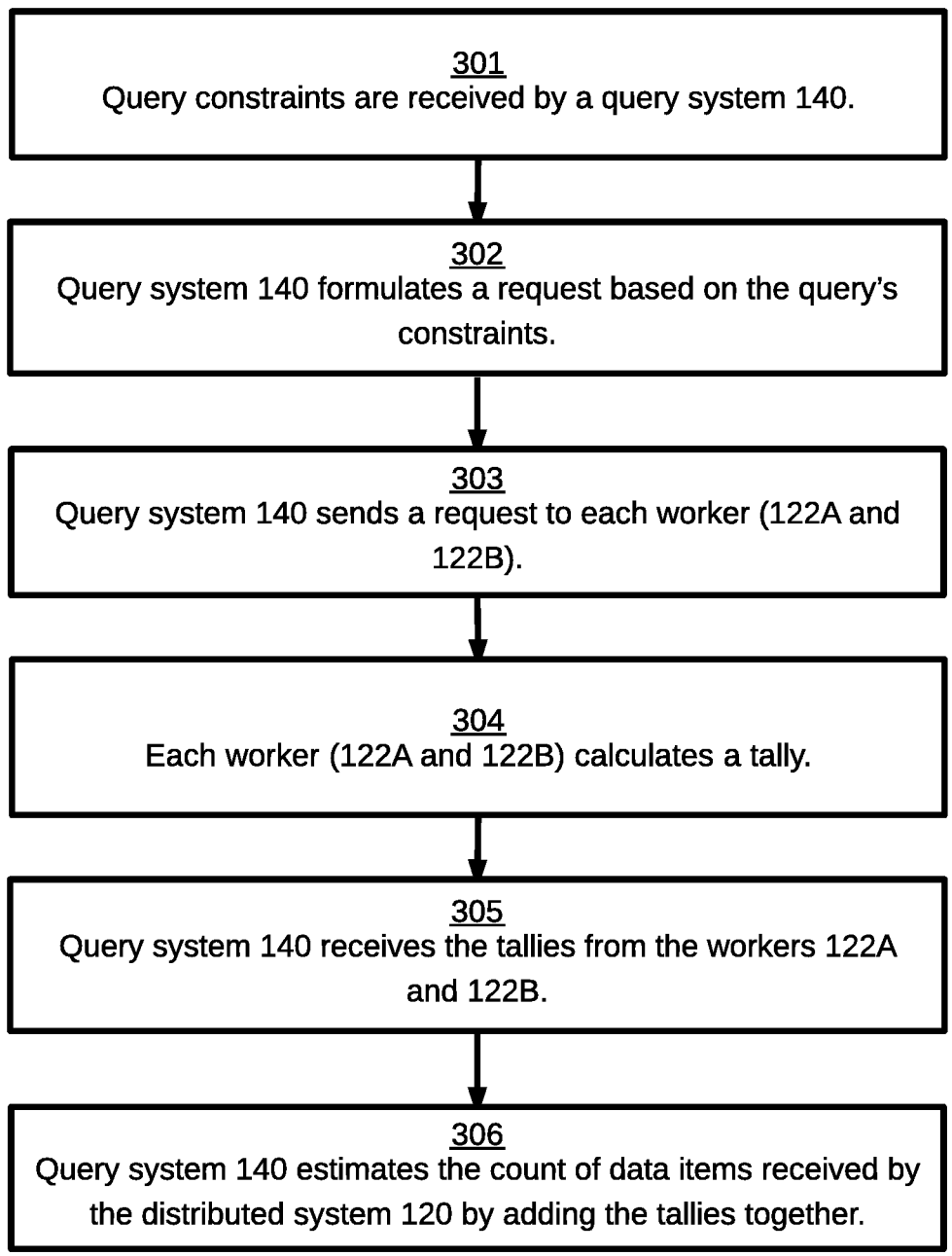
FIG. 3 is a flow chart illustrating a method of estimating a count of data items received at a distributed system processing a networked publisher's streaming data, in accordance with an embodiment of the invention.

FIG. 3 is a flow chart illustrating a method of estimating a count of data items received at a distributed system processing a networked publisher's streaming data, in accordance with an embodiment of the invention. In some implementations, the steps are performed in an order other than the order presented in FIG. 3, and in other implementations, additional or alternative steps may be performed.

In step 301, query constraints are received by a query system 140. Query system 140 interacts with distributed system 120 to provide an estimated count of data items received at the distributed system matching a set of one or more constraints. A constraint limits the estimated count of data items to data items matching the constraints.

In step 302, query system 140 formulates a request based on the query's constraints.

In step 303, query system 140 sends a request to each worker 122A and 122B.

In step 304, each worker calculates a tally. A tally is an estimate of the number of data items assigned to the worker based on an analysis of the data items stored by the worker. In an example, each data item stored in a publisher data store by a worker represents a number of data items assigned to the worker equal to the inverse of the publisher data store's sampling ratio. That means that for every data item stored by a worker in a data partition's publisher data store with a sampling ratio of 25%, it is estimated that four data items were received by that worker.

In step 305, query system 140 receives the tallies from the workers. In an example, a worker may send a tally to the query system 140 or put the tally in a storage accessible by the query system 140.

In step 306, query system 140 estimates the count of data items received by the distributed system 120 by adding the tallies together. In some cases, a query system 140 may not receive a tally from each worker. In this case, the query system 140 may estimate the contributions of the missing tallies based on the values of the received tallies and include the contributions of the missing tallies in the estimated count of items received by the distributed system 120.

Physical Components of a Computer

Figure 4:
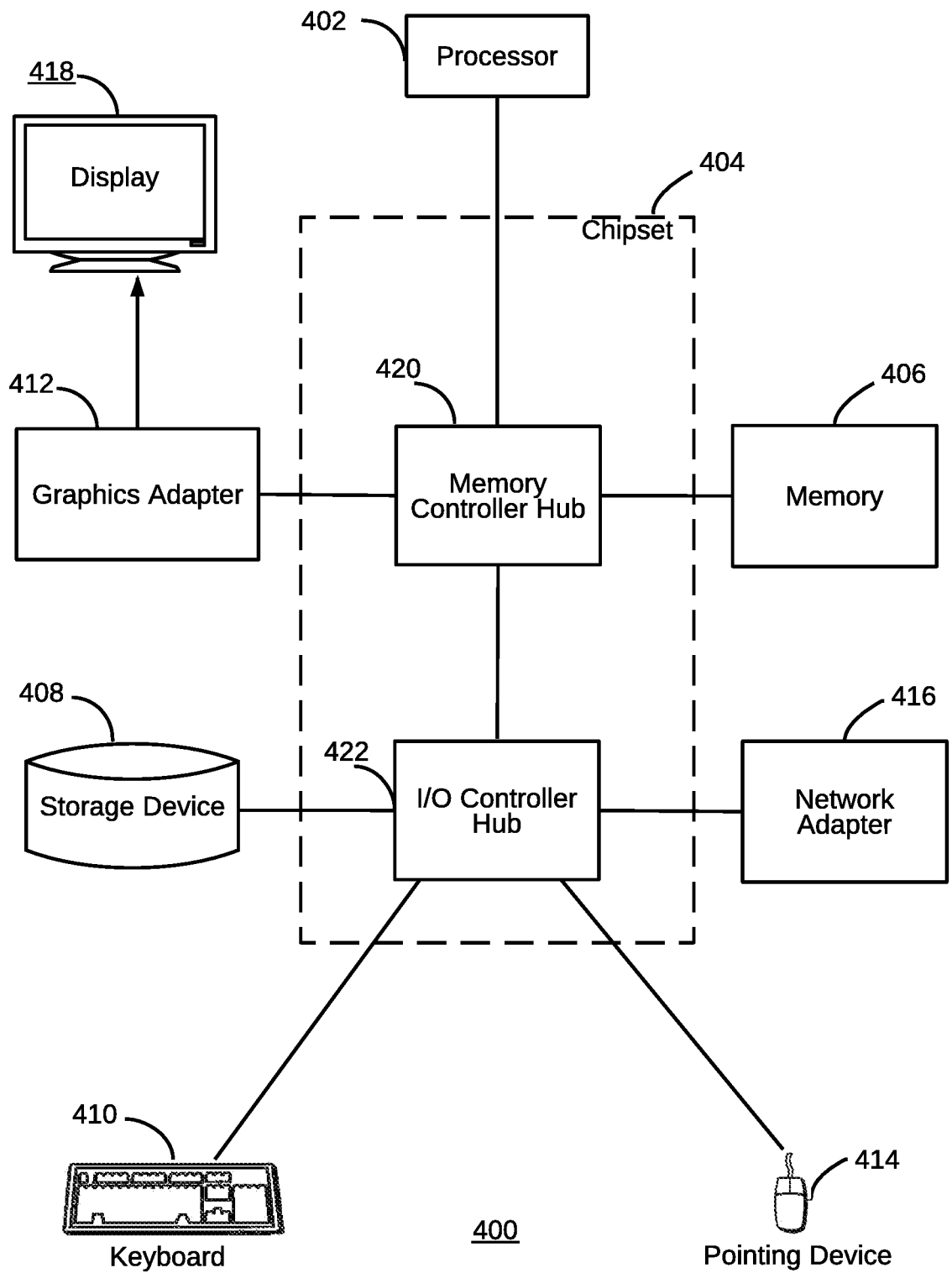
FIG. 4 is a high-level block diagram of the components of a computing system for use, for example, for managing a distributed system processing a networked publisher's streaming data depicted in FIG. 1, in accordance with an embodiment of the invention.

FIG. 4 is a high-level block diagram of the components of a computing system 120 for use, for example, for managing a distributed system processing a networked publisher's streaming data and a query system 140 depicted in FIG. 1, in accordance with an embodiment of the invention. Illustrated are at least one processor 402 coupled to a chipset 404. Also coupled to the chipset 404 are a memory 406, a storage device 408, input device(s) 410, a network adapter 412, and a graphics adapter 414. A display 416 is coupled to the graphics adapter 414. In one embodiment, the functionality of the chipset 404 is provided by a memory controller hub 420 and an I/O controller hub 422. In another embodiment, the memory 406 is coupled directly to the processor 402 instead of the chipset 404.

The processor 402 is the hardware logic circuitry of the computer 400 that processes instructions such as computer programs to operate on data. The memory 406 holds instructions and data used by the processor 402. The storage device 408 is any non-transitory computer-readable storage medium, such as a hard drive, compact disk read-only memory (CD-ROM), DVD, or a solid-state memory device. The input devices(s) 410 may be a keyboard, mouse, track ball, touch-sensitive screen and/or another type of pointing device to input data into the computer 400. The network adapter 412 couples the computer 400 to a network. The graphics adapter 414 displays images and other information on the display 416.

As is known in the art, a computer 400 can have different and/or other components than those shown in FIG. 4. In addition, the computer 400 can lack certain illustrated components. In one embodiment, a computer 400 acting as a server may lack an input device 410, a graphics adapter 414, and/or a display 416. Moreover, the storage device 408 can be local and/or remote from the computer 400 (such as embodied within a storage area network (SAN)).

As is known in the art, the computer 400 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method of managing a distributed system processing streaming data received over a network from a data source, the distributed system comprising a plurality of data stores and a plurality of workers, wherein each of the plurality of data stores is dedicated to the data source, and wherein each of the plurality of workers is dedicated to a respective data store, the method comprising:

selecting, by each of the workers, based on a criteria, a sampling ratio, the sampling ratio defining a fraction of data items selected for storage in the respective data store, wherein a first worker selects a first sampling ratio and a second worker selects a second sampling ratio, and wherein the first and second sampling ratios are different;

responsive to receiving, by the distributed system, streaming data comprising data items from the data source:
assigning, by the distributed system, data items from the streaming data to the workers; and
storing, by each of the assigned workers, based on the respective sampling ratios of each of the assigned workers, data items from the assigned data items in the respective data store;

responsive to receiving, by the distributed system, a query request, wherein the query request comprises a constraint:
distributing, by the distributed system, the query request to each of the workers;

processing, by each of the workers, the query request, wherein the processing comprises:
determining a tally of data items stored in the respective data store meeting the constraint of the query; and
estimating a count of data items assigned to the worker meeting the constraint of the query by dividing the tally by the respective sampling ratio of the respective worker;
estimating, by the distributed system, a total of data items received by the distributed system from the data source meeting the constraint of the query by totaling the estimated counts of data items from each of the workers; and
providing, by the distributed system, the estimated total of data items received by the distributed system from the data source meeting the criteria.

2. The method of claim 1, wherein the criteria is based on a historical sampling ratio of the respective data store.

3. The method of claim 1, wherein the criteria is based on a historical received data item volume of the respective data store.

4. The method of claim 1, wherein the assigning is based on the workload of each of the workers.

5. The method of claim 1, wherein the assigning is based on the location of each of the workers and on the location where the data item was received.

6. The method of claim 1, wherein the data items each comprise an identifier of an entity, and wherein the storing further comprises:
computing, by each worker, a key value by applying a hash function to each assigned data item's identifier, the hash function having a range and the key value falling within the hash function's range;
computing, by each worker, the respective data store scope, wherein the respective data store scope is equal to the hash function's range multiplied by the data store's selected sampling ratio;
identifying, by each worker, key assigned data items from the assigned data items where the key value of the data item falls within the corresponding data store's scope; and
storing, by each worker, data items from the key assigned data items, based on the sampling ratio.

7. The method of claim 6, wherein each data item represents an interaction between the entity and a publisher.

8. The method of claim 1, wherein receiving the query request further comprises receiving the query request over the network from the data source and wherein providing the estimated total of data items further comprises providing over the network the estimated total of data items to the data source.

9. The method of claim 1, wherein selecting the sampling ratio further comprises:
responsive to determining, by the first worker, that the number of data items stored in the respective data store using the first sampling ratio exceeds an upper limit, selecting, by the first worker, a third sampling ratio, wherein the third sampling ratio is smaller than the first sampling ratio.

10. A system comprising:
a processor; and
a computer readable storage medium storing processor-executable computer program instructions, the computer program instructions comprising instructions for managing a distributed system processing streaming data received over a network from a data source, the distributed system comprising a plurality of data stores and a plurality of workers, wherein each of the plurality of data stores is dedicated to the data source, and wherein each of the plurality of workers is dedicated to a respective data store, the method comprising:
selecting, by each of the workers, based on a criteria, a sampling ratio, the sampling ratio defining a fraction of data items selected for storage in the respective data store, wherein a first worker selects a first sampling ratio and a second worker selects a second sampling ratio, and wherein the first and second sampling ratios are different;
responsive to receiving, by the distributed system, streaming data comprising data items from the data source:
assigning, by the distributed system, data items from the streaming data to the workers; and
storing, by each of the assigned workers, based on the respective sampling ratios of each of the assigned workers, data items from the assigned data items in the respective data store;
responsive to receiving, by the distributed system, a query request, wherein the query request comprises a constraint:
distributing, by the distributed system, the query request to each of the workers;
processing, by each of the workers, the query request, wherein the processing comprises:
determining a tally of data items stored in the respective data store meeting the constraint of the query; and
estimating a count of data items assigned to the worker meeting the constraint of the query by dividing the tally by the respective sampling ratio of the respective worker;
estimating, by the distributed system, a total of data items received by the distributed system from the data source meeting the constraint of the query by totaling the estimated counts of data items from each of the workers; and
providing, by the distributed system, the estimated total of data items received by the distributed system from the data source meeting the criteria.

11. The system of claim 10, wherein the criteria is based on a historical sampling ratio of the respective data store.

12. The system of claim 10, wherein the criteria is based on a historical received data item volume of the respective data store.

13. The system of claim 10, wherein the assigning is based on the workload of each of the workers.

14. The system of claim 10, wherein the assigning is based on the location of each of the workers and on the location where the data item was received.

15. The system of claim 10, wherein the data items each comprise an identifier of an entity, and wherein the storing further comprises:
  computing, by each worker, a key value by applying a hash function to each assigned data item's identifier, the hash function having a range and the key value falling within the hash function's range;
  computing, by each worker, the respective data store scope, wherein the respective data store scope is equal to the hash function's range multiplied by the data store's selected sampling ratio;
  identifying, by each worker, key assigned data items from the assigned data items where the key value of the data item falls within the corresponding data store's scope; and
  storing, by each worker, data items from the key assigned data items, based on the sampling ratio.

16. The system of claim 15, wherein each data item represents an interaction between the entity and a publisher.

17. The system of claim 10, wherein receiving the query request further comprises receiving over the network the query request from the data source and wherein providing the estimated total of data items further comprises providing over the network the estimated total of data items to the data source.

18. The method of claim 10, wherein selecting the sampling ratio further comprises:
  responsive to determining, by the first worker, that the number of data items stored in the respective data store using the first sampling ratio exceeds an upper limit, selecting, by the first worker, a third sampling ratio, wherein the third sampling ratio is smaller than the first sampling ratio.

19. A non-transitory computer-readable medium with computer executable instructions executed by a processor to perform a method of managing a distributed system processing streaming data received over a network from a data source, the distributed system comprising a plurality of data stores and a plurality of workers, wherein each of the plurality of data stores is dedicated to the data source, and wherein each of the plurality of workers is dedicated to a respective data store, the method comprising:
  selecting, by each of the workers, based on a criteria, a sampling ratio, the sampling ratio defining a fraction of data items selected for storage in the respective data store, wherein a first worker selects a first sampling ratio and a second worker selects a second sampling ratio, and wherein the first and second sampling ratios are different;
  responsive to receiving, by the distributed system, streaming data comprising data items from the data source:
    assigning, by the distributed system, data items from the streaming data to the workers; and
    storing, by each of the assigned workers, based on the respective sampling ratios of each of the assigned workers, data items from the assigned data items in the respective data store;
  responsive to receiving, by the distributed system, a query request, wherein the query request comprises a constraint:
    distributing, by the distributed system, the query request to each of the workers;
    processing, by each of the workers, the query request, wherein the processing comprises:
      determining a tally of data items stored in the respective data store meeting the constraint of the query; and
      estimating a count of data items assigned to the worker meeting the constraint of the query by dividing the tally by the respective sampling ratio of the respective worker;
    estimating, by the distributed system, a total of data items received by the distributed system from the data source meeting the constraint of the query by totaling the estimated counts of data items from each of the workers; and
    providing, by the distributed system, the estimated total of data items received by the distributed system from the data source meeting the criteria.

20. The method of claim 19, wherein receiving the query request further comprises receiving the query request from the data source and wherein providing the estimated total of data items further comprises providing the estimated total of data items to the data source.

\* \* \* \* \*